March 30, 1965 W. LIBEN 3,175,639
METHOD FOR MEASURING FORMATION POROSITY, PERMEABILITY
AND MUD CAKE THICKNESS IN OIL WELL BORE
HOLES BY SONIC PULSES
Filed Oct. 19, 1960 2 Sheets-Sheet 1
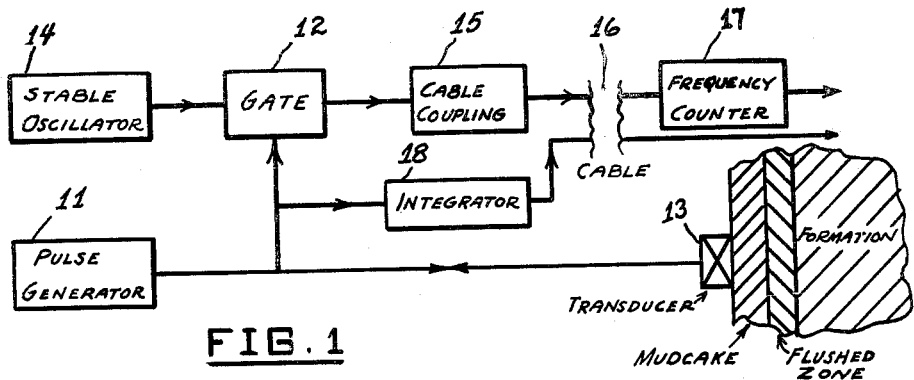
FIG.1
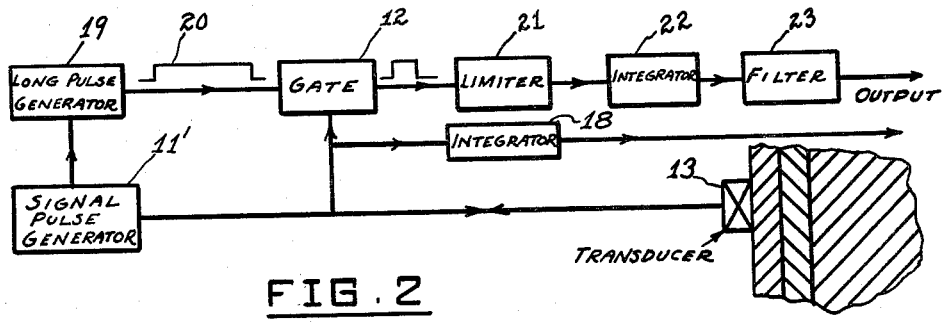
FIG.2
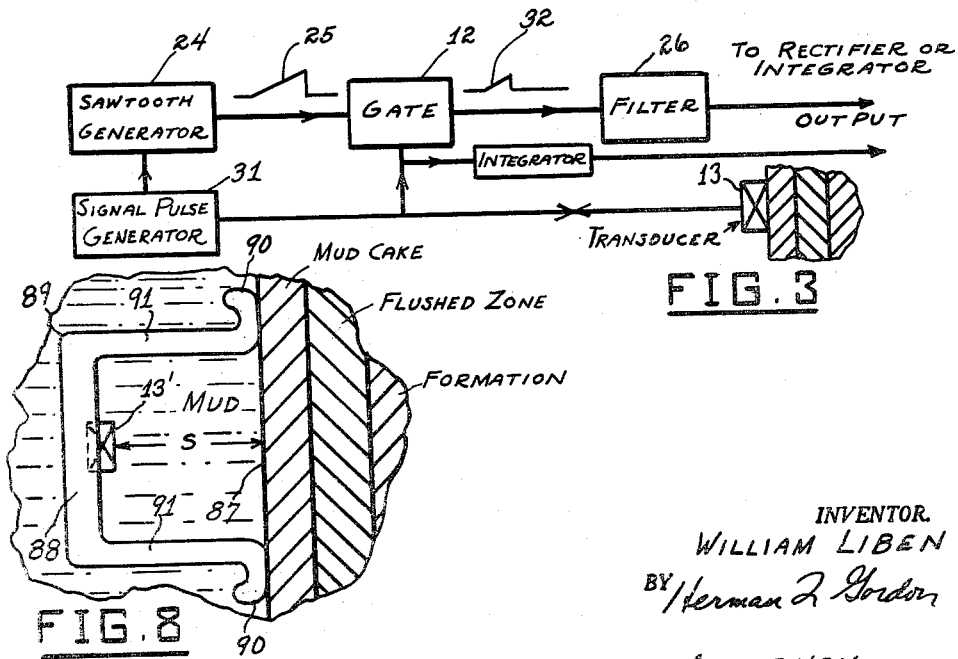
FIG.3
FIG.8
INVENTOR.
WILLIAM LIBEN
BY Herman L Gordon
ATTORNEY March 30, 1965   W. LIBEN   3,175,639
METHOD FOR MEASURING FORMATION POROSITY, PERMEABILITY
AND MUD CAKE THICKNESS IN OIL WELL BORE
HOLES BY SONIC PULSES
Filed Oct. 19, 1960   2 Sheets-Sheet 2

INVENTOR.
WILLIAM LIBEN
BY Herman L Gordon
ATTORNEY

United States Patent Office

3,175,639
Patented Mar. 30, 1965

3,175,639
METHOD FOR MEASURING FORMATION POROSITY, PERMEABILITY AND MUD CAKE THICKNESS IN OIL WELL BORE HOLES BY SONIC PULSES
William Liben, 11404 Monticello Ave., Silver Spring, Md.
Filed Oct. 19, 1960, Ser. No. 63,611
1 Claim. (Cl. 181—.5)

This invention relates to well logging systems, and more particularly to a system for measuring formation porosity, permeability and mud cake thickness in oil wells by sonic pulses.

A main object of the invention is to provide a novel and improved method for accurately measuring the formation porosities, permeabilities and mud cake thickness along an oil well bore by sonic pulses.

A further object of the invention is to provide an improved system for measuring formation porosity, permeability and mud cake thickness in an oil well bore by applying a sonic pulse to the mud cake layer of the bore so that the pulse will be reflected at the interface between the mud cake and the well wall and will be returned, and measuring the elapsed time between the generation and return of the sonic pulse and the height of the returned pulse.

A still further object of the invention is to provide an improved apparatus for measuring the formation porosity, permeability and mud cake thickness in a well bore, said apparatus being simple in construction, being compact in size, and providing accurate data to enable the formation porosity and permeability to be determined, thus permitting the potential commercial value of the well to be precisely evaluated.

A still further object of the invention is to provide an improved method of measuring the formation porosity and permeability in an oil well by determining the mud cake thickness and sonic reflectivity, and determining therefrom the acoustic impedance of the flushed zone of the formation, the method providing precise sharply defined indications of changes in formations along the well bore, not requiring any corrections for mud effects, and not being affected by the connate fluids in the formations.

Further objects and advantages of the invention will become apparent from the following description and claims and from the accompanying drawings, wherein:

FIGURE 1 is a block diagram of one form of apparatus for carrying out the improved method of measuring the formation porosity and permeability in a well bore according to the present invention.

FIGURE 2 is a block diagram of another form of apparatus for performing the method of the present invention.

FIGURE 3 is a block diagram of still another form of apparatus for performing the method of the present invention.

FIGURE 8 is an enlarged diagrammatic side elevational view showing an apparatus supporting a transducer adjacent the wall of a well bore as employed in performing a modified form of method of measuring the porosity, permeability and mud cake thickness in accordance with the present invention.

Figure 6:
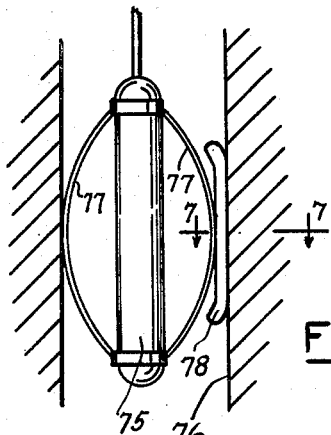
FIGURE 6 is a side elevational view of a well logging apparatus according to the present invention, shown in operating position in a well bore.

The method of the present invention is intended to be employed in an oil well after drilling is partially or entirely completed, and before the well is cased, to measure the porosity and permeability of the formations through which the oil well has penetrated, and the mud cake thickness. This type of measurement would form part of an oil well logging program. Porosity and permeability data are desirable for potential oil or gas producing formations, since they permit a relatively precise evaluation of the potential commercial value of the well.

When an oil well is drilled and the drilling tools are withdrawn from the well, the well is full of a solution or suspension of various chemicals in either water or oil. The chemicals and solvent are selected to solve certain problems encountered in the drilling operation. The liquid is commonly known as "mud."

Upon the wall of the well and forming an inner layer is a solid formed when the mud is filtered through the following process: The earth formation consists of a solid matrix of grains or granules cemented together to form a solid matrix. The voids or interstices between the grains form pores and the fraction of the volume occupied by the pores to the total volume is known as the "porosity." Furthermore, these pores are interconnected by canals, and the number and size of these interconnecting canals determines the ability of fluids to flow through the solid matrix. This ease of fluid flow is called the "permeability," which is defined as the quantity of fluid which flows through a unit area in unit time with a unit pressure gradient across the solid matrix.

By virtue of the pores in the formation and the permeability, the formation acts as a filter. As pressure is applied to the mud during the normal drilling operation, the formation acting as a filter allows the filtrate of the mud to flow into the pores, depositing the mud solute on the inner wall to form a solid layer known as the "mud cake." The amount of filtrate which flows into the formation is determined by the porosity and the permeability of the formation, which therefore also determines the thickness of the mud cake. The part of the formation immediately next to the well wall is completely flushed by the filtrate, that is, the original fluids in the pores are completely replaced by the filtrate. As we pass away from the well wall, the completeness of the flushing action decreases and we find that the pores retain more and more of their original fluids. These fluids are the connate waters, oil, gas, or mixtures thereof. Therefore, as we pass from the well wall deeper into the formation, we have regions in which the pores are filled with a known fluid (the mud filtrate); regions in which the pores are filled with filtrate and the original fluids in ever decreasing amounts of filtrate; and finally we reach the portions in which the pores are filled with the original fluids.

It is important to notice that the formation pores immediately adjacent to the mud cake are always filled with a known fluid, the filtrate. Since the mud cake is also a known material, the reflection of sonic waves or pulses at the interface between the mud cake and the flushed zone depends on the acoustic impedance of the mud cake, which is known, and the acoustic impedance of the flushed zone, in which the only unknown factor is the porosity. Therefore, if we measure the sonic reflectance at the interface we can calculate the porosity. It should be understood that the nature of the solid matrix has been previously determined in a well known manner by other means, such as an electric log.

It should be further understood that for a given material, curves giving the relationship between acoustic impedance and porosity may be readily obtained from empirically determined data.

As mentioned above, the amount of filtrate forced into the formation depends on the formation porosity and permeability, and this in turn determines the mud cake thickness. From a measurement of the mud cake thickness, the porosity being known, it is possible to calculate the formation permeability.

It is important to note that in the present invention, measurements are made on known materials on a point by point basis, while previously used sonic velocity logging systems measure the sonic velocity in parts of the formation in which the pores are filled with unknown fluids, and give average values over distances of about five feet.

To measure the formation porosity and permeability in accordance with one embodiment of the present invention, a sonic pulse generating and receiving transducer is applied to the wall of the mud cake, and sonic pulses are generated by the transducer. These pulses travel through the mud cake at a velocity $v$, become normally incident upon the boundary between the mud cake and the flushed zone, are reflected backward at said boundary, travel a second time through the mud cake, impinge upon the transducer, and thus induce electrical pulses therein. The elapsed time between the generation and the reception of the sonic pulses is measured, as well as the height, or amplitude, of the returned pulse. In combination with known other data it is then possible to compute the porosity and permeability of the formation.

It is to be noted that reflections occurring beyond the mud cake-flushed zone interface are ignored.

Let the height, or amplitude, of the original generated sonic pulse be H. In travelling through the mud cake, a fraction $a$ of the sonic pulse is absorbed by the mud cake, so that $H(1-a)$ is the height, or amplitude, of the pulse incident upon the formation-mud cake interface. If the acoustic impedance of the mud cake is represented by $Z_{MC}$, and the acoustic impedance of the flushed zone as $Z_F$, then the sonic reflection coefficient $K_R$ for normal incidence is given by $$K_R = \frac{1-R}{1+R}$$

where $$R = \frac{Z_F}{Z_{MC}}$$

Therefore, the reflected pulse height, $H_R$, is given by $$H_R = \frac{H(1-a)(1-R)}{1+R}$$

The reflected pulse returns through the mud cake, where again a fraction $a$ is absorbed, so that the height $H_1$ of the pulse incident on the sonic transducer is given by $$H_1 = H_R(1-a) = \frac{H(1-a)^2(1-R)}{1+R}$$

The elapsed time $t$ between the generation and reception of the sonic pulse is given by $$t = \frac{2T_{MC}}{v}$$

where $T_{MC}$ is the mud cake thickness.

The acoustic impedance of a material is defined to be the product of the material density and the sonic velocity in the material. It is therefore a function of the nature of the material.

If the height $H_1$ of the returned pulse is measured and the generated pulse height H is known, the ratio $r$ thereof is given by $$r = \frac{H_1}{H} = \frac{(1-a)^2(1-R)}{1+R}$$

It is well known for a given material, and for a given pulse, the absorption depends upon the thickness traversed by the pulse. Since the type of mud used is known, and the characteristic absorption A and the sonic velocity $v$ are known, from the measured time $t$ $$\left(\text{equal to } \frac{2T_{MC}}{v}\right)$$

the mud cake thickness $T_{MC}$ can be computed because $$T_{MC} = \frac{vt}{2}$$

Since the mud cake thickness $T_{MC}$ is now known, and since the type of mud used and its characteristic absorption A are known, the value of $a$ can be computed from $$1-a = e^{-AT_{MC}}, \text{ where } e = 2.718$$

The characteristic absorption A is the reciprocal of the mud cake thickness which reduces the amplitude of the transmitted wave to $1/e$ of the original amplitude.

Using the now known values of $a$ and $r$, it is possible to compute the value of R from the above equation, because $$R = \frac{(1-a)^2 - r}{(1-a)^2 + r}$$

Thus, since $$R = \frac{Z_F}{Z_{MC}},$$

$$Z_F = R \cdot Z_{MC} = Z_{MC}\left(\frac{(1-a)^2 - r}{(1-a)^2 + r}\right)$$

Since the properties of the mud and mud cake are known, the acoustic impedance $Z_{MC}$ of the mud cake is known. Therefore, the acoustic impedance $Z_F$ of the flushed zone can be computed by substituting the values of $a$ and $r$ in the above equation, as follows:

$$Z_F = \left(\frac{e^{-2AT_{MC}} - \frac{H_1}{H}}{e^{-2AT_{MC}} + \frac{H_1}{H}}\right) Z_{MC}$$

From this equation it will be seen that the acoustic impedance $Z_F$ of the flushed zone can be found by using the measured values of the mud cake thickness $T_{MC}$ and the height $H_1$ of the returned pulse, knowing the original height H of the pulse, the characteristic absorption A of the mud, and the acoustic impedance $Z_{MC}$ of the mud cake.

This equation can be further expressed to include the measured time of travel $t$ of the pulse and the known sonic velocity $v$, as follows:

$$Z_F = \left(\frac{He^{-Avt} - H_1}{He^{-Avt} + H_1}\right) Z_{MC}$$

A substantial amount of work is in progress in geophysics which attempts to determine the porosity of a formation from a measurement of the sonic velocity. Present methods of measuring the acoustic velocity actually measure the velocity in the formation containing the connate fluids, the mud filtrate, or mixtures of these. In addition, the measured values must be corrected for the effects of the well fluids and the mud cake. The correlation of sonic velocity and porosity has been studied, for example, by G. R. Pickett, "Acoustic Logs in Evaluation of Sandstone Reservoirs," Geophysics, vol. 25, page 250, 1960. An equation can be written relating formation density D and porosity $\phi$, as follows:

$$D = \phi D_f + (1-\phi) D_F$$

where $D_f$ is the filtrate density and $D_F$ is the density of the formation matrix. Pickett presents equations relating formation sonic velocity and porosity, which can be used with the above equation and the measured value of $Z_F$ to compute the porosity $\phi$. The formation matrix density $D_F$ can be determined from the lithology of the well, as determined by a conventional spontaneous potential and resistivity log.

It is well known that the mud cake thickness $T_{MC}$ for a given type of mud is a function of the formation porosity $\phi$ and the permeability. Since all of the required data are known, it is possible to compute the formation permeability.

In addition to the lithology and the mud type, the temperature and pressure must also be known. The temperature can be computed with sufficient accuracy from the known geothermal gradients, or a temperature log can be run. The pressure can be computed in a manner shown by Pickett in the above mentioned article.

Among the advantages of the method of the present invention over conventional velocity logging methods are: (1) conventional sonic velocity equipment measures an average over a bore hole distance of approximately five feet, so that changes in formation properties are ill-defined, whereas the method of the present invention measures the sonic properties substantially at a point in the borehole, and thus shows formation changes with great precision and resolution; furthermore, there are no spurious responses where there are cracks or other abrupt changes in the formation. (2) Conventional velocity logs must be corrected for mud effects, whereas the method of the present invention does not require this correction. (3) The conventional velocity log is affected by the connate fluids, particularly in the medium and higher porosity ranges, whereas the method of the present invention is not so affected. (4) The conventional method gives false results if voids or fractures are in the path of the sonic pulses, whereas the method of the present invention is not so affected. (5) The conventional method does not measure the permeability.

In view of the usual mud cake thickness encountered and the usual range of sonic velocities found, the least travel time of the pulse will be about 5 microseconds, and the maximum travel time will be about 100 microseconds. Therefore, the pulse width used should be approximately in the range between 1 and 2 microseconds, while a pulse repetition rate of about 1000 pulses per second would be suitable.

One form of apparatus which may be employed to practise the method of the present invention is diagrammatically illustrated in FIGURE 1. A pulse generator 11 produces pulses at a precisely known rate and of a precisely known height, the pulse width being in the range between 1 and 2 microseconds. These pulses are applied to a gating device 12, of conventional construction, and to a sonic transducer 13, such as a piezoelectric crystal. A stable oscillator 14 produces sine waves at a constant rate, for example, 10 million per second, and the output of oscillator 14 is connected through the gating device 12 and a suitable cable coupling device 15 on the cable 16. The gating device opens responsive to the application of an output pulse thereto from generator 11, allowing the sine waves from oscillator 14 to pass through to the cable 16 and up the cable to a frequency counter 17 connected to the cable at the surface adjacent the well. When the reflected pulse returns from transducer 13, it is also applied to the gating device 12, shutting it off so that the sine waves can no longer pass through to the cable. Thus, the total number of sine waves counted by the frequency counter 17 while the gating device 12 is open measures the pulse travel time in the mud cake. The frequency counter converts the waves counted into a D.C. signal whose magnitude is proportional to the number of waves counted in a time equal to its time constant. If, for example, the time constant is 0.1 second and the logging tool moves at a rate of 8 inches per second, the thickness resolution of the device is 0.8 inch, which is about equal to the diameter of the transducer which probably would be used. Also, using the values mentioned above, the counter would count 5000 sine waves for a 5 microsecond travel time. This number of waves can be counted with good accuracy.

The returned pulse is also applied to an integrator 18 of conventional construction whose output is a D.C. signal proportional to the area or average height, for the pulses in the integrator's time constant, which should equal the time constant of the counter 17. Therefore, the integrator output, which is delivered also to the cable 16, is proportional to the returned pulse height, and can be employed to provide an eventual D.C. output signal representing the quantity $r$.

The intergrator measures the area of a pulse $$(\text{width} \times \text{height})$$

Since the width is known and constant, the integrator effectively measures the pulse height.

FIGURE 2 diagrammatically illustrates another form of apparatus for practising the method of the present invention. In this form, the pulses from a pulse generator 11' are applied to a long pulse generator 19 to cause the generator 19 to produce relatively long pulses 20, which are applied to a conventional gating device 12. The pulses from generator 11' are applied to said gating device to open same to allow transmission of the long pulse 20 until the gating device 12 is closed by a reflected pulse from the transducer 13, whereby the length of the portion of the pulse 20 passing through the gate is in accordance with the travel time $t$ through the mud cake of the sonic pulses produced by the transducer. The transmitted portion of pulse 20 is passed through a limiter 21, an integrator 22 and a filter 23 to provide an ultimate D.C. output signal.

The pulse generator 11' produces a narrow pulse which is applied to the sonic transducer 13 and simultaneously to the gating device 12 to open same. The generator 11' also transmits a pulse to the long pulse generator 19, which produces the pulse 20, which is of a length exceeding the longest expected pulse travel time through the mud cake. The returned pulse closes the gate 12, so that the pulse leaving gate 12 equals the travel time $t$ in length. The limiter 21 insures that the pulse height equals a standard convenient value. Since the pulse height is fixed and the time constant of filter 23 is also fixed at a convenient value, the output of the filter 23 is a D.C. voltage proportional to the pulse length, which is proportional to the sonic pulse travel time $t$ in the mud cake. The quantity $r$ is measured in the same manner as in FIGURE 1.

In the apparatus illustrated diagrammatically in FIGURE 3, a signal pulse generator 31 produces a narrow pulse which is applied to the sonic transducer 13 and the gating device 12 to open same. It also produces a second pulse which triggers a sawtooth generator 24, generating a sawtooth wave 25 which starts through the gate 12. The sawtooth wave 25 has a fixed known slope and is of a duration which exceeds the longest expected sonic pulse travel time in the mud cake. When the returned pulse is applied to the gating device 12, it closes same and cuts off the sawtooth wave so that the issuing wave, shown at 32, is of a length, and therefore height, which is proportional to the sonic pulse travel time $t$ in the mud cake.

The issuing sawtooth wave 32 can be treated in either of two ways: (1) it can be averaged (in a rectifier, for example) to produce a D.C. output voltage proportional to the sonic pulse travel time $t$ in the mud cake, or (2) it can be integrated, whereby the integrator output is proportional to the square ($t^2$) of the travel time, so that the mud cake thickness is proportional to the square root of the integrator output.

Figure 4:
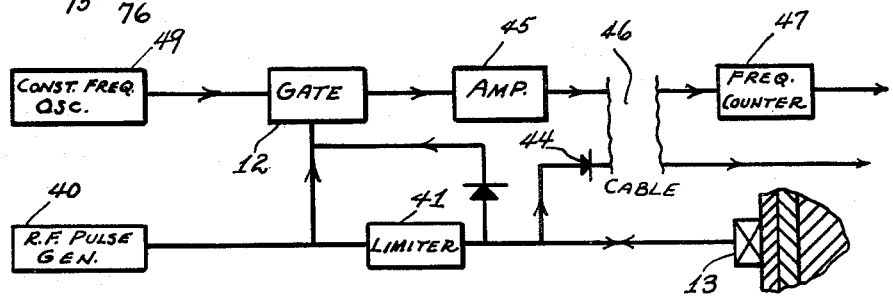
FIGURE 4 is a block diagram of still another form of apparatus for carrying out the method of the present invention.

In the modification illustrated in FIGURE 4, a constant frequency oscillator 49 is connected through a gating device 12 and an amplifier 45 to the cable 46. An R.F. pulse generator 40 is connected to the gating device 12 to control the opening of same; pulse generator 40 generates short trains of sinusoidal waves (of at least between 10 and 20 waves) which are applied to the gating device 12 to open same and which are amplified to a standard constant amplitude in a limiter 41. The pulsed limited waves are then applied to the transducer 13. The returned pulse is applied to the gate 12 to close same; this allows a number of waves from the oscillator 49 to pass through the gating device while it is open, in accordance with the pulse travel time $t$ in the mud cake. The returned pulse is also rectified by passing through a rectifier 44. When the gate 12 is closed the number of sine waves from the constant frequency oscillator 49 which have passed through are coupled to the cable after amplification in the amplifier 45, and pass up the cable 46 to a frequency counter 47. The output of frequency counter 47 is thus proportional to the pulse travel time $t$ in the mud cake. The output of the rectifier 44 is applied to a conductor of the cable 46 and is measured at the surface, said rectifier output being proportional to the value $r$.

The system of FIGURE 4 has some advantages over the D.C. pulse method, since the transducer 13 can be designed so that it is tuned to the selected R.F. frequency, thus greatly increasing the transducer efficiency; also, narrow band circuitry can be used in preference to the wide band circuitry required for D.C. pulse applications.

Figure 5:
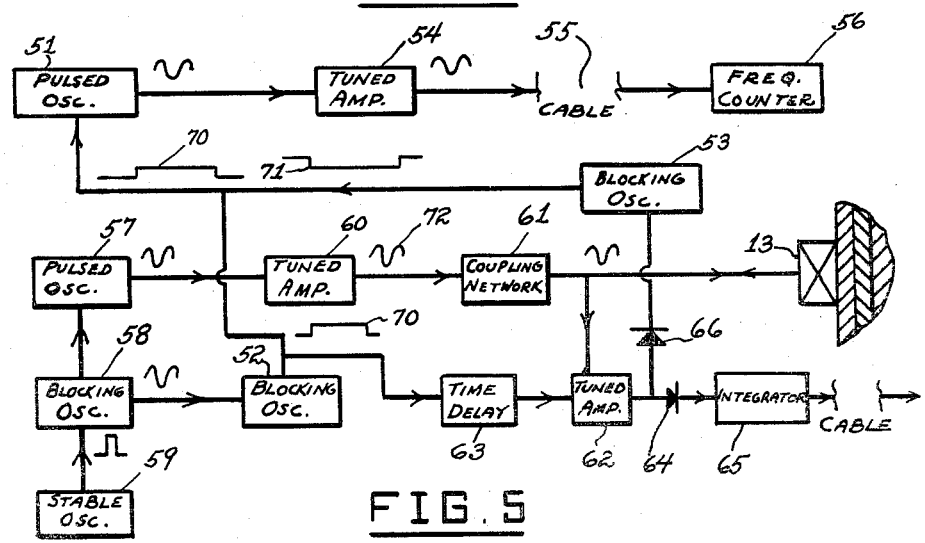
FIGURE 5 is a block diagram showing a detailed embodiment of the apparatus shown in FIGURE 4.

FIGURE 5 illustrates a more detailed embodiment of the pulsed sinusoidal wave system of FIGURE 4.

In FIGURE 5, 51 designates a stable pulsed sinusoidal oscillator, preferably crystal-controlled, used to measure the mud cake travel time. Its frequency may be, for example, 10 megacycles. It is turned on by the positive long pulse 70 from a blocking oscillator 52 and is turned off by the negative long pulse 71 from a blocking oscillator 53. Designated at 54 is an amplifier tuned to the frequency of oscillator 51. This amplifier couples the pulsed sine wave from oscillator 51 to the cable 55, which conducts the sine waves to the surface, where they are counted by a frequency counter 56. Designated at 57 is a second pulsed sinusoidal oscillator whose frequency may be, for example, 5 megacycles, and which produces an output only when it receives a pulse from a blocking oscillator 58. This pulse may be of the order of a few microseconds long. The blocking oscillator 58 is driven by a stable oscillator 59 (whose frequency may be within the audio range). Blocking oscillator 52 is driven by pulses from oscillator 58, which produces the long pulses 70, of the order of 100 microseconds in length, which are longer than the longest mud cake travel time likely to be encountered.

The long pulses 70 set the oscillator 51 into oscillation. The pulsed sine waves generated by oscillator 57 are amplified in a tuned amplifier 60, which is a tuned A.C. stable amplifier of constant amplitude output. Designated at 61 is a coupling network which couples the pulsed sine waves, shown at 72, to the transducer 13, which then produces pulsed sonic sine waves in the mud cake lining the borehole. Amplifier 54 begins to pass sine waves from oscillator 51 at exactly the same instant that transducer 13 produces the pulsed sonic sine waves.

Designated at 62 is a tuned amplifier which is controlled by the long pulse 70 from oscillator 52. This long pulse is delayed by passing through a time delay circuit 63 by a time such that amplifier 62 is not operable until transducer 13 has stopped producing sonic waves. However, immediately after the drive to the transducer 13 has ceased, amplifier 62 is made operable. The reflected sonic wave produces a voltage wave in transducer 13, and this "reflected" pulse sine wave is now amplified by amplifier 62 and applied to a rectifier 64. The output of rectifier 64 is a D.C. voltage proportional to the amplitude of the "reflected" sine waves. This D.C. output is applied to the integrator 65, which has a suitable time constant, for example, 0.1 second. The output of integrator 65 is therefore proportional to the value $r$ averaged over a time constant.

Meanwhile, the "reflected" pulsed sine wave is applied to a second rectifier 66. The output of rectifier 66 is a D.C. pulse which triggers the blocking oscillator 53, which produces the negative long pulse 71 equal in length to pulse 70. The pulse 71 is applied to oscillator 51 and turns it off so that sine waves can no longer pass through amplifier 54. If the elapsed time between the generation of a voltage pulse in transducer 13 by the reflected sonic pulse and the turning off of oscillator 51 is small compared to the travel time in the mud cake, the number of sine waves passing through amplifier 54 measures the mud cake travel time $t$; if this elapsed time is not negligibly small, a suitable correction can be made therefor when the mud cake thickness is computed.

These waves travel up the cable 55 to the surface and are counted by the frequency counter 56, providing a D.C. output. If the time constant of frequency counter 56 is equal to the time constant of integrator 16, which is a preferred condition, the output of frequency counter 56 gives a value representing the average travel time in the mud cake for the same length of borehole as that for which the output of integrator 65 represents the average value of $r$.

The outputs of frequency counter 56 and integrator 65 can then be recorded as a function of depth in a manner well known in the oil well logging art.

Figure 7:
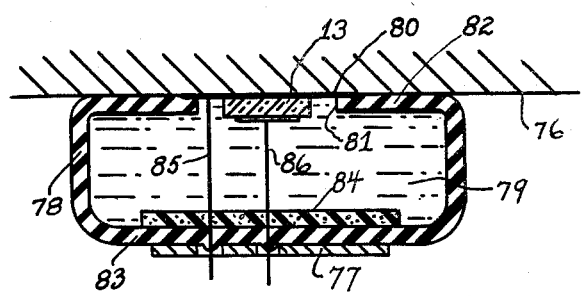
FIGURE 7 is an enlarged horizontal cross-sectional view taken substantially on the line 7—7 of FIGURE 6.

Referring to FIGURES 6 and 7, the main components of the apparatus may be mounted in a suitable housing 75 suspended by the associated cable in the borehole, shown at 76. The housing is provided with the resilient bowed feeler springs 77 engaging the borehole interior surface, and the transducer 13 may be mounted in a hollow shoe 78 secured to the intermediate portion of one of the springs 77 so as to be resiliently held against the mud cake. The hollow shoe 78 may comprise a rubber bag filled with a liquid 79 selected to have a large acoustic mismatch to the transducer 13 and such as to be chemically inert with respect to the material of the bag. The transducer 13 is mounted on a flexible metal plate 80 secured in an aperture 81 in the outer wall 82 of the bag, namely the wall which is adjacent the mud cake. Secured on the inside surface of the opposite wall 83 of the bag is a layer 84 of acoustic absorbing wall 83 of as metal wool, sponge rubber, or the like. The flexible terminal wires 85 and 86 associated with the transducer pass sealingly through the acoustic pad 84 and the wall 83 and through the associated feeler spring 77, as shown in FIGURE 7, said wire extending into the main housing 75.

FIGURE 8 illustrates a transducer supporting arrangement employed in a modification of the method of the present invention wherein the transducer, shown at 13′, is spaced a known fixed distance $s$ from the mud cake wall, shown at 87. Thus, the transducer 13′ is mounted on the bight portion 88 of a generally U-shaped rigid metal shoe 89 having curved contact elements 90, 90 at the ends of its legs 91, 91.

In the arrangement of FIGURE 8, if the sonic velocity in the mud is $V_M$, then the pulse travel time $t_1$ in the mud is given by $$t_1 = \frac{2s}{V_M}$$

In this case we have two reflected pulses; one from the mud-mud cake interface 87, of travel time $T_1$ and with a ratio $r'$ of returned to transmitted pulse amplitudes given by $$r' = \frac{(1-a_M)^2(1-R_M)}{1+R_M}$$

where $$R_M = \frac{Z_{MC}}{Z_M}$$

$Z_M$ = the acoustic impedance of the mud, and
$a_M$ = the mud absorption.

The second reflected pulse is, as above, reflected from the mud cake-formation interface (the flushed zone), but the amplitude ratio $r$ is now given by $$r = \frac{(1-a_M)^2(2R_M)^2(1-a)^2(1-R)}{(1+R)(1+R_M)^2}$$

while the travel time $$t_2 = t_1 + \frac{2T_{MC}}{v}$$

Using a more complex equipment and measuring $t_1$, $t_2$, $r$ and $r'$, we can compute a more precise value for the formation acoustic impedance $Z_F$. The procedure is as follows: first, the type of mud and its density $D_M$ are determined. From $t_1$ and $s$, the value of $V_M$ can then be found. Now, the mud absorbtivity $A_M$, the mud cake absorbtivity $A$, and the mud cake sonic velocity $v$ can be obtained from tables.

$1-a_M = e^{-sAM}$, where $e$ is the constant 2.718

From the measured value of $r'$ we can now compute $R_M$. From the measured values of $t_1$ and $t_2$ and $v$ we can compute the mud cake thickness $T_{MC}$ and $1-a = e^{-T_{MC}A}$.

Using the measured value $r$ we can now compute R. The product $$R_M R = \left(\frac{Z_{MC}}{Z_M}\right)\left(\frac{Z_F}{Z_{MC}}\right) = \frac{Z_F}{D_M V_M}$$

so that $$Z_F = D_M V_M R_M R$$

From the above measured, calculated and tabulated data, we can proceed to obtain the formation porosity and permeability, as described above. The measurement of the mud sonic velocity permits a more precise evaluation of the formation acoustic impedance, though requiring more complex equipment and computations than in the previously described method according to this invention.

While certain specific embodiments of methods and means for determining formation porosity and permeability by sonic pulses have been disclosed in the foregoing description, it will be understood that various modifications within the spirit of the invention may occur to those skilled in the art. Therefore it is intended that no limitations be placed on the invention except as defined by the scope of the appended claim.

What is claimed is:

A method of evaluating formation porosity and permeability in a bore hole having a mud cake layer on its wall from the acoustic impedance of the flushed zone between the mud cake layer and the adjacent formation comprising measuring the mud cake thickness by applying a sonic pulse to the outer face of the mud cake layer directed so that the pulse will be reflected at said flushed zone and return to said outer face and measuring the elapsed time between the application and return of the sonic pulse, and measuring the change in amplitude between the applied and returned pulse, so that the acoustic impedance of the flushed zone can be determined from the equation $$Z_F = \left(\frac{e^{-2AT_{MC}} - \frac{H_1}{H}}{e^{-2AT_{MC}} + \frac{H_1}{H}}\right) Z_{MC}$$

where $Z_F$ is the acoustic impedance of the flushed zone,
$e$ is 2.718 (the Naperian base),
$A$ is the characteristic absorption of the mud,
$T_{MC}$ is the mud cake thickness,
$H_1$ is the amplitude of the returned pulse,
$H$ is the amplitude of the applied pulse, and
$Z_{MC}$ is the acoustic impedance of the mud cake.

References Cited by the Examiner

UNITED STATES PATENTS

| | | | |
|---|---|---|---|
| 2,200,476 | 5/40 | Mounce | 181—.5 |
| 2,595,241 | 5/52 | Goble | 181—.5 X |
| 2,596,023 | 5/52 | Goble et al. | 181—.5 |
| 2,794,512 | 6/57 | Martin | 181—.5 |
| 2,813,590 | 11/57 | McDonald | 181—0.5 |
| 2,949,973 | 8/60 | Broding et al. | 181—0.5 |
| 2,980,884 | 4/61 | Kaasa | 181—.5 X |
| 3,050,150 | 8/62 | Tixier | 181—.5 |

SAMUEL FEINBERG, *Primary Examiner.*

BENJAMIN A. BORCHELT, KATHLEEN H. CLAFFY, CARL W. ROBINSON, *Examiners.*